United States Patent
Bailo et al.

(10) Patent No.: US 8,166,336 B2
(45) Date of Patent: Apr. 24, 2012

(54) METHOD AND SYSTEM FOR CAMPAIGN MANAGEMENT

(75) Inventors: Paul J. Bailo, Trumbull, CT (US); Stephen K. Dantu, New Hempstead, NY (US); Marat S. Khalfin, Staten Island, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 1131 days.

(21) Appl. No.: 11/551,477

(22) Filed: Oct. 20, 2006

(65) Prior Publication Data

US 2008/0097926 A1    Apr. 24, 2008

(51) Int. Cl.
*G06F 11/00* (2006.01)
(52) U.S. Cl. .......................... 714/4.12; 714/6.3
(58) Field of Classification Search ............ 714/4.12, 714/6.3
See application file for complete search history.

(56) References Cited

U.S. PATENT DOCUMENTS

| | | | |
|---|---|---|---|
| 6,240,411 B1 | 5/2001 | Thearling | |
| 6,694,447 B1 * | 2/2004 | Leach et al. | 714/6 |
| 2001/0056554 A1 * | 12/2001 | Chrabaszcz | 714/13 |
| 2004/0153757 A1 | 8/2004 | Blakeney | |
| 2005/0182676 A1 | 8/2005 | Chan | |
| 2006/0015406 A1 | 1/2006 | Beyda et al. | |
| 2006/0015764 A1 * | 1/2006 | Ocko et al. | 714/4 |
| 2006/0026064 A1 | 2/2006 | Collins | |
| 2006/0212453 A1 * | 9/2006 | Eshel et al. | 707/10 |
| 2007/0150334 A1 * | 6/2007 | Bergh et al. | 705/10 |
| 2007/0294577 A1 * | 12/2007 | Fiske | 714/13 |
| 2008/0077462 A1 * | 3/2008 | Patel et al. | 705/7 |
| 2008/0086402 A1 * | 4/2008 | Patel et al. | 705/35 |
| 2008/0097928 A1 * | 4/2008 | Paulson | 705/80 |

OTHER PUBLICATIONS

International Search Report dated Mar. 7, 2008, for PCT Application No. PCT/US07/22185, 3 pages.
Written Opinion dated Mar. 7, 2008, for PCT Application No. PCT/US07/22185, 4 pages.
PCT; International Preliminary Report on Patentability dated Apr. 22, 2009 in Application No. PCT/US2007/022185.

* cited by examiner

*Primary Examiner* — Bryce Bonzo
(74) *Attorney, Agent, or Firm* — Snell & Wilmer L.L.P.

(57) ABSTRACT

Campaign-production management is performed for a plurality of campaigns on at least a primary server or a secondary server. The plurality of campaigns is processed on the primary server. The contents of the plurality of campaigns are synchronized between the primary server and the secondary server. On failure of the primary server, processing of the plurality of campaigns is transferred to the secondary server. Further, the failback of the processing of the campaigns is performed on the primary server.

18 Claims, 4 Drawing Sheets

METHOD AND SYSTEM FOR CAMPAIGN MANAGEMENT

BACKGROUND OF THE INVENTION

1. Field of the Invention

The present invention generally relates to computerized business management systems. More particularly, the invention relates to management of campaigns, such as marketing campaigns.

2. Background Art

Organizations in diverse industry sectors engage in new marketing strategies. Potential customers are targeted with new or ongoing marketing campaigns to expand the customer base. Campaign management is performed to target customers with a message and to track their preferences. Cost-effective and flawless execution of marketing campaigns facilitates a profitable dialog and a healthy relationship with customers.

Some organizations utilize Enterprise Marketing Management (EMM) solutions to streamline and automate their marketing campaign processes. EMM solutions help to deploy profile-driven marketing campaigns across multiple channels. Examples of channels include email, direct mail, fax, web, telemarketing, and the like. Organizations may use EMM solutions to deliver personalized messages to their target audience to determine the trends of customers' interests and needs. Such interactions are expected to build stronger and more profitable customer relationships that maximize customer value. EMM solutions may be customized to meet the requirements of an organization.

EMM solutions are limited by their implementation, which uses a single server for campaign management. This limitation causes disruption of campaign management on the failure of the single server, limiting the performance of EMM solutions and affecting the efficiency of the campaigns.

Another limitation of EMM solutions may be the presence of web-based authentication systems. The web-based authentication systems maintain security by permitting only authorized access for campaign management. These web-based authentication systems may be bottlenecks that result in a decline in the productivity of campaign management.

Given the foregoing, what is needed is a method and system for preventing a disruption of the processing of campaigns. Further, the system should be able to implement immediate failback measures and restore campaign management without sacrificing the productivity and efficiency of campaign management.

BRIEF SUMMARY OF THE INVENTION

The present invention meets the needs identified above by providing a method, system and computer program product for campaign management.

An advantage of the present invention is that it performs campaign-production management for a plurality of campaigns.

Another advantage of the present invention is that it performs a failover of the processing of the campaigns on the failure of a primary server.

Another advantage of the present invention is that it performs synchronization of contents between two servers present in the system.

Yet another advantage of the present invention is that it performs a failback of the processing of the campaigns.

The invention presents a method, system and computer program product for campaign-production management, which is performed for the various campaigns being processed. Examples of processing include creating, updating, modifying, executing, terminating, analyzing, and the like. Campaign-production management is implemented by utilizing two or more campaign-production environments. Each campaign-production environment corresponds to a particular target group. In one embodiment, the target groups may be classified, for example, as (1) a customer cards target group referred to herein as "CCSG") and (2) a small business target group (referred to herein as "OPEN"). In accordance with various embodiments of the invention, campaign-production management may be implemented simultaneously in the CCSG and OPEN environments.

In the example embodiment, enterprise marketing management solutions are implemented through two servers, referred to as a first server and a second server, which support the CCSG and OPEN environments. In the CCSG environment, the first server acts as a primary server and the second server as a secondary server. Similarly, in the OPEN environment, the second server acts as a primary server and the first server as a secondary server. Processing of the campaigns is performed by the primary servers of each of the two environments. In various embodiments of the invention, contents relating to the various campaigns are synchronized periodically between the two servers.

In the case of both the environments, processing of the campaigns is transferred to the corresponding secondary server on the failure of the primary server. The secondary server acts as a backup server on the failure of the primary server. Further, the failback of the processing of the campaigns is performed on the primary server.

BRIEF DESCRIPTION OF THE DRAWINGS/FIGURES

The features and advantages of the present invention will become more apparent from the detailed description set forth below, when taken in conjunction with the drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed to a method, system and computer program product for campaign-production management. Campaign-production management is performed for a plurality of campaigns that are processed on the system. The system includes at least two servers, one acting as a primary server and the other as a secondary server. Different sets of users may process campaigns simultaneously on the servers. The contents relating to the campaigns are synchronized periodically between the servers. The processing of the campaigns is transferred to the secondary server on the failure of the primary server. Each server can act as a primary server for one campaign and a secondary server for another campaign. Further, the system performs failback to the primary server, to restore the processing of the campaigns on the primary server.

The present invention is now described in more detail herein in terms of the above-mentioned exemplary embodiment. This is for convenience only and is not intended to limit the application of the present invention. In fact, after reading the following description, it will be apparent to one skilled in the relevant art(s) how the following invention can be implemented in alternative embodiments, e.g., in the various software and hardware platforms being used, the mode of implementation of the invention, the end use of the invention, etc.

II. System

Figure 1:
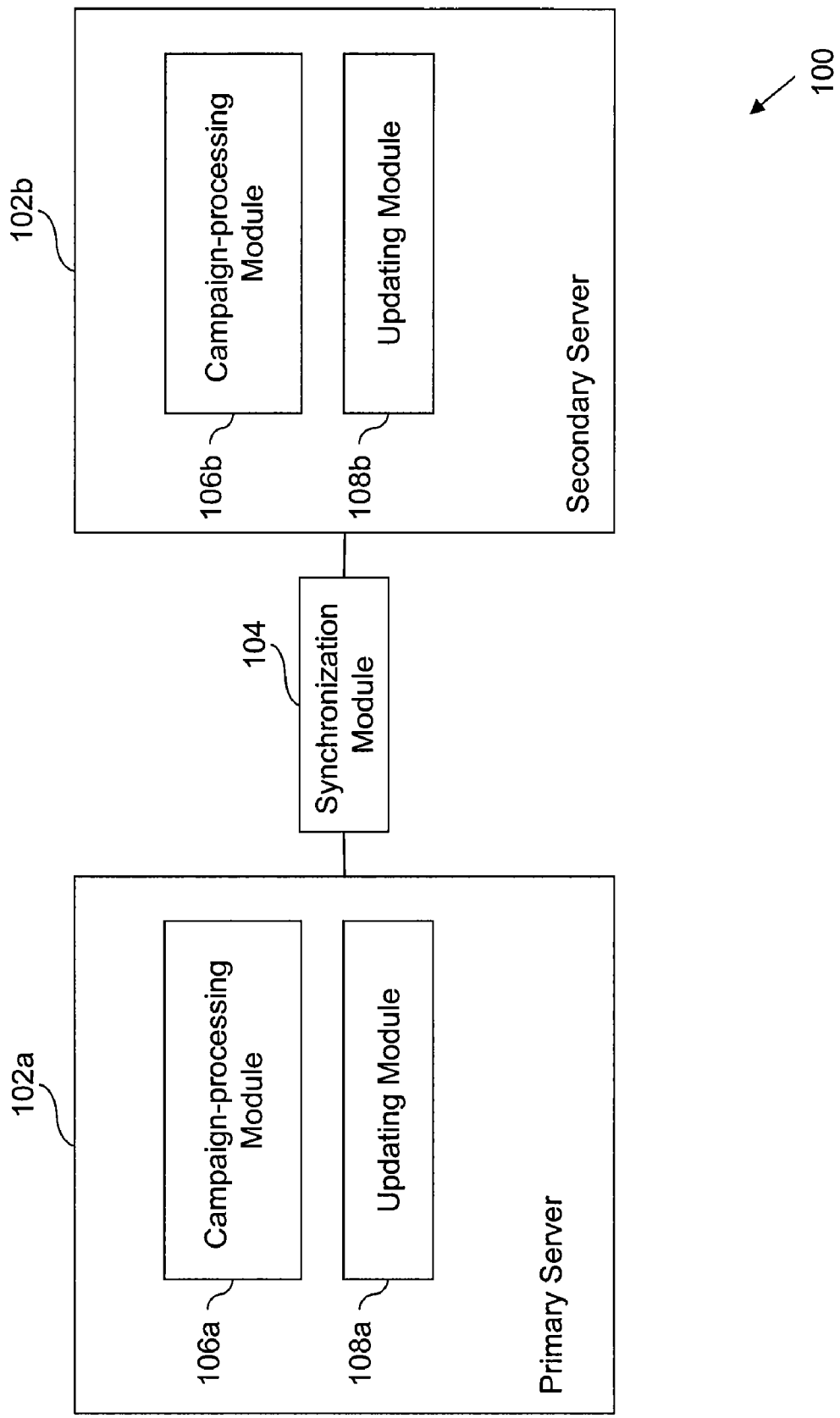
FIG. 1 is a block diagram of an exemplary system for campaign-production management, in accordance with an embodiment of the invention.

FIG. 1 is a block diagram providing an overview of an exemplary system 100. In an embodiment of the invention, system 100 performs campaign-production management for a plurality of campaigns. System 100 includes a primary server 102a, a secondary server 102b, and a synchronization module 104. Primary server 102a includes a campaign-processing module 106a and an updating module 108a. Similarly, secondary server 102b includes a campaign-processing module 106b and an updating module 108b.

System 100 may be supported by an enterprise marketing management solution. In accordance with an embodiment of the invention, the enterprise marketing management solution may be a UNICA Affinium suite, available from Unica Corporation, Waltham, Mass. The UNICA Affinium suite includes UNICA Affinium files that assist users in processing various campaigns.

Campaign-processing modules 106a and 106b process the plurality of campaigns. Examples of processing include creating, updating, modifying, executing, terminating, analyzing, selecting, excluding, segmenting, sampling, and the like. Campaign-processing modules 106a and 106b utilize the data present with primary server 102a and secondary server 102b, respectively, for processing of the campaigns. The data includes customer data and Universal Dynamic Interconnect (UDI) data. Several extracts of the data may be utilized for the processing of the campaigns, resulting in campaign-specific sessions. In the example embodiment, these sessions are UNICA Affinium files that include campaign-specific information such as data lists, campaign-processing schedules, quality control rules; selection, exclusion, segmentation and sampling criteria; file layouts, and the like.

Updating modules 108a and 108b update data stored on primary server 102a and secondary server 102b, respectively. In an embodiment of the invention, the data is updated periodically. In an embodiment of the invention, updating of the data may include the addition of new customer data and/or the modification of pre-existing customer data.

Synchronization module 104 performs synchronization of contents between primary server 102a and secondary server 102b. Examples of the contents include tables, catalogs, macros, templates, extracts, sessions, customer data, and the like. The tables include customer data and system files. In the example embodiment, the catalogs, macros and templates are UNICA Affinium files that are specific to the internal working of the UNICA Affinium suite. The catalogs are utilized for database mapping.

Synchronization of the contents may be performed to aid processing of the campaigns on the failure of a particular server. For example, processing of the campaigns is transferred to secondary server 102b on the failure of primary server 102a. The transferred campaigns may be processed by utilizing the synchronized contents. On the restoration of primary server 102a, processing of the campaigns is transferred back from secondary server 102b to primary server 102a.

In an embodiment of the invention, the contents are synchronized periodically. Different contents may have different time periods for synchronization. Also, synchronization of the contents may be manually initiated or may take place automatically.

In an alternative embodiment of the invention, primary server 102a and secondary server 102b include separate synchronization modules for synchronizing the contents between primary server 102a and secondary server 102b.

In an embodiment of the invention, various campaigns may be executed automatically at a predetermined time. The users may schedule a batch run of selected campaigns through a web interface without accessing UNICA application terminals.

III. Process

Figure 2:
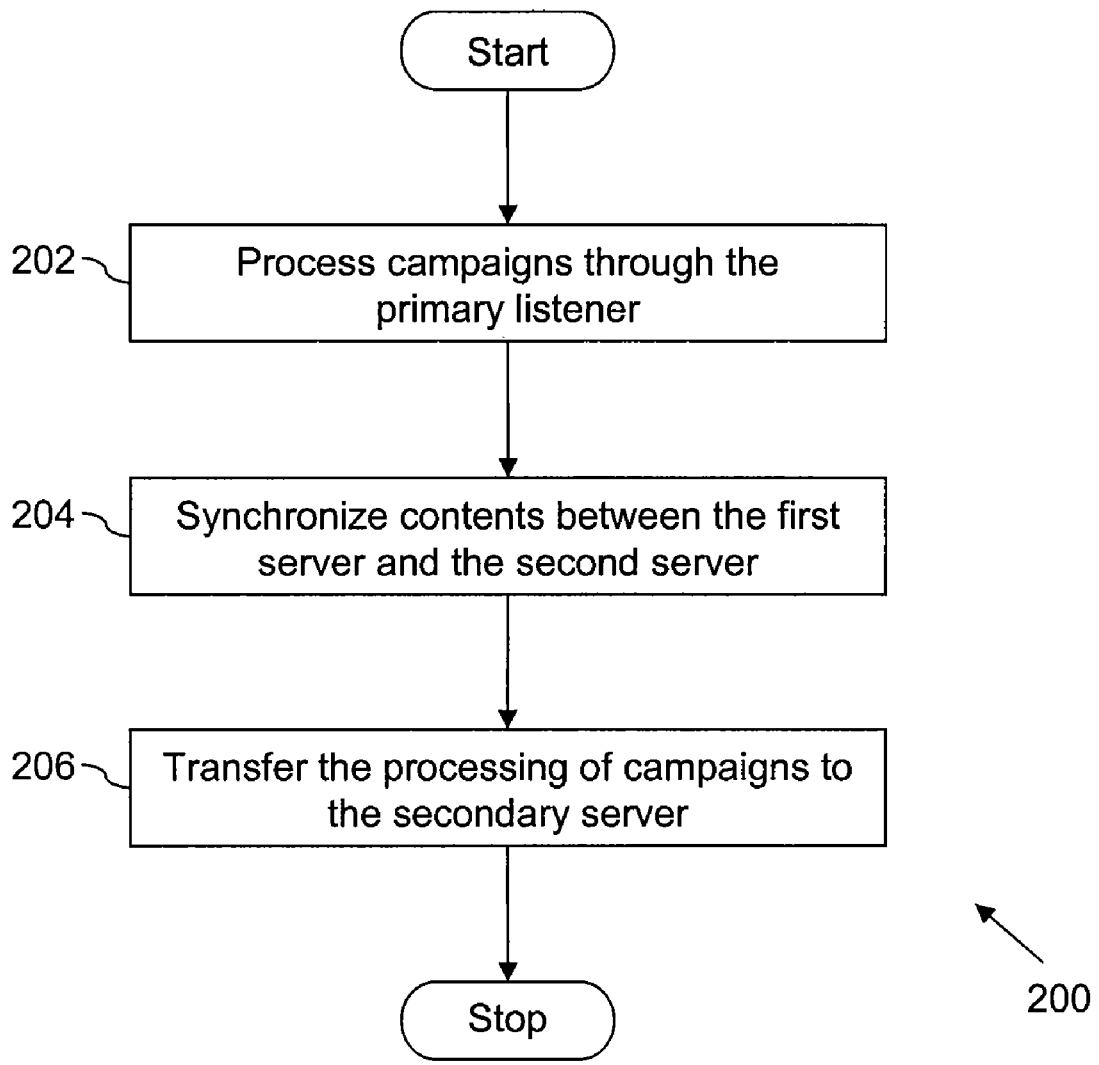
FIG. 2 is a flowchart illustrating a process for campaign-production management, in accordance with an embodiment of the invention.

FIG. 2 is a flowchart illustrating a process 200 for campaign-production management, in accordance with an embodiment of the invention. In an example embodiment of the invention, process 200 is implemented by utilizing two campaign-production environments. Each campaign-production environment corresponds to a particular target group. In the example embodiment, the target groups may be classified as either (1) a customer cards target group (referred to herein as "CCSG") or (2) a small business target group (referred to herein as "OPEN"). The two campaign-production environments are hereinafter referred to as the CCSG and OPEN environments, which are in consonance with the two target groups. Two servers, hereinafter referred to as first and second servers, support the CCSG and OPEN environments. Each server includes a primary listener and a backup listener for either of the two environments.

In various embodiments of the invention, both the CCSG and the OPEN environments are implemented simultaneously by using an enterprise marketing management solution.

For the CCSG environment, the first server acts as a primary server and includes a primary CCSG listener, and the second server as a secondary server, which includes a backup CCSG listener. Similarly, for the OPEN environment, the second server acts as a primary server and includes a primary OPEN listener, and the first server acts as a secondary server and includes a backup OPEN listener.

At step 202, campaigns are processed through the primary listener. In the CCSG environment, processing of the campaigns is performed through the primary CCSG listener. Similarly, in the OPEN environment, processing of the campaigns is performed through the primary OPEN listener. Examples of processing include creating, updating, modifying, executing, terminating, analyzing, selecting, excluding, segmenting, sampling, and the like. Processing of the campaigns utilizes the contents present in the servers. Examples of these contents include tables, catalogs, macros, templates, extracts, sessions, customer data, and the like.

At step 204, contents are synchronized between the first server and the second server. For the CCSG environment, the contents are synchronized between the primary CCSG listener and the backup CCSG listener. Similarly, for the OPEN environment, the contents are synchronized between the primary OPEN listener and the backup OPEN listener. The contents may be synchronized at different time periods on a weekly, a daily or hourly basis. In various embodiments of the invention, synchronization of contents takes place automatically.

At step 206, processing of the campaigns may be transferred to the secondary server. In the CCSG environment, processing of the campaigns is transferred from the primary CCSG listener to the backup CCSG listener present on the second server on the failure of the first server. Similarly, in the OPEN environment, processing of the campaigns is transferred from the primary OPEN listener to the backup OPEN listener present on the first server on the failure of the second server.

In the example embodiment of the invention, processing of the campaigns may be transferred from the primary listener to the backup listener within about 60 minutes.

The system also allows failback to the primary server. In the CCSG environment, failback is allowed to the primary CCSG listener present on the first server. In the OPEN environment, failback is allowed to the primary OPEN listener present on the second server.

IV. Example Implementation

Figure 3:
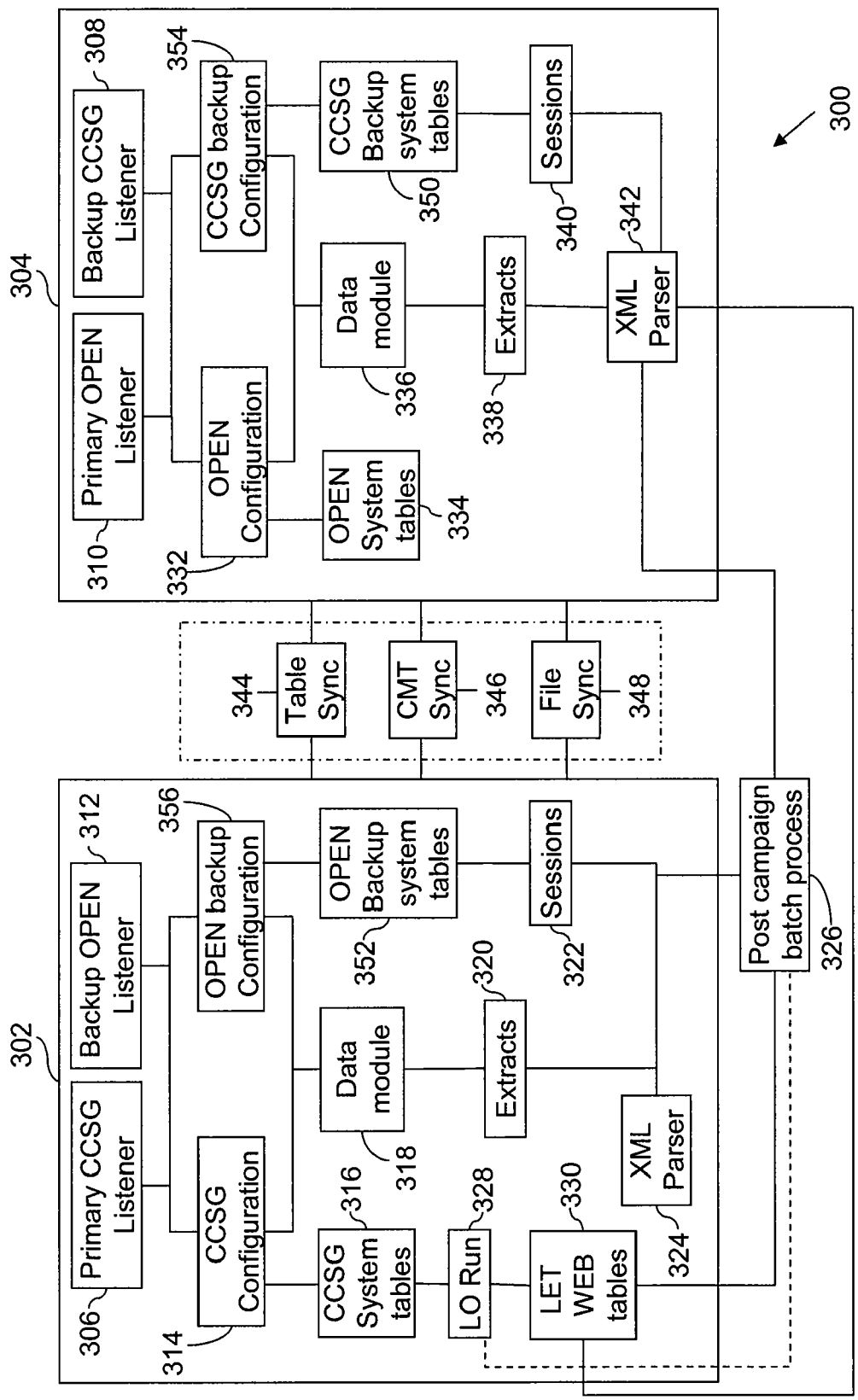
FIG. 3 is a block diagram of an exemplary system for campaign-production management, in accordance with an alternative embodiment of the invention.

FIG. 3 is a block diagram providing a detailed view of an exemplary system 300. System 300 is supported by the UNICA Affinium suite described above. In this example embodiment, processing of campaigns utilizes UNICA Affinium files to assist in campaign-production management.

In an embodiment of the invention, system 300 supports the functioning of two campaign-production environments. In this example embodiment, the two campaign-production environments are the CCSG and the OPEN environments, as described in conjunction with FIG. 2. Each campaign-production environment may be implemented through two listeners present in system 300.

System 300 includes two servers, server 302 and server 304. Each server includes two listeners, one for each environment. For the CCSG environment, server 302 acts as a primary server and includes a primary CCSG listener 306, and server 304 acts as a secondary server and includes a backup CCSG listener 308. For the OPEN environment, server 304 acts as a primary server and includes a primary OPEN listener 310, and server 302 acts as a secondary server and includes a backup OPEN listener 312.

In the CCSG environment, primary CCSG listener 306 is automatically instantiated on the receipt of campaign-processing requests. Primary CCSG listener 306 traffics campaign-processing requests from UNICA application terminals through CCSG configuration 314. CCSG configuration 314 is a configuration file that includes various details of primary CCSG listener 306, which points to a primary application thread.

Processing of the campaigns is performed by the utilization of CCSG system tables 316 and data module 318. CCSG system tables 316 include UNICA Affinium system tables that are used to extract information for processing the campaigns. The UNICA Affinium system tables contain campaign details, session details, and the like.

Data module 318 includes customer data and UDI data, which are utilized for processing the campaigns. UDI data enables access to external databases and flat files. The information available through UDI may be accessed or manipulated by the users for processing the campaigns. Data module 318 may also access user-created temporary files and temporary tables during session runs.

Processing of the campaigns is further implemented by extracts 320 and sessions 322. Extracts 320 includes data lists to be utilized for the processing of the campaigns. The data lists may be prepared by accessing data module 318 or through UDI files. The UDI files are user-created data files that are utilized by mapping UNICA Affinium catalogs. The UDI files enable direct usage of external data without the creation of data-specific tables.

Sessions 322 includes UNICA Affinium binary files that include campaign-specific information such as data lists, campaign-processing schedules, quality control rules; selection, exclusion, segmentation and sampling criteria; file layouts, and the like. The campaign-specific information relates to the logic being utilized for processing the campaigns. Sessions 322 stores campaign-specific information for all campaigns being processed at a particular instance of time on server 302.

Further, campaign output files are produced by the utilization of XML parser 324. XML parser 324 extracts campaign-specific information from CCSG XML files, to be used for post-campaign-processing.

Post-campaign-processing is implemented by post-campaign batch process 326. Post-campaign batch process 326 bridges the gap between campaign output files and users and validates the output files produced by UNICA. Post-campaign batch process 326 utilizes information from extracts 320, sessions 322 and XML parser 324. Examples of post-campaign-processing include an analysis of campaign results, preparation of marketing lists, and the like.

In an embodiment of the invention, various campaigns may be executed automatically at a predetermined time. This scheduled execution of campaigns may be implemented by utilizing Lights Out (LO) run 328 and List Execution Transformation (LET) Web tables 330. In an embodiment of the invention, users may schedule the batch run of selected campaigns through a web interface without accessing the UNICA application terminals. LO run 328 initiates the scheduled batch run by accessing CCSG system tables 316. LET Web tables 330 support LET Web portal and post-campaign-processing.

In the OPEN environment, primary OPEN listener 310 is automatically instantiated on the receipt of campaign-processing requests. Processing of campaigns is implemented in a way that is similar to the CCSG environment by utilizing OPEN configuration 332, OPEN system tables 334, data module 336, extracts 338, sessions 340, and XML parser 342. Post-campaign batch processing is performed by post-campaign batch process 326.

Synchronization of the contents is performed between server 302 and server 304 by utilizing table sync 344, Catalogs Macros Templates (CMT) sync 346, and file sync 348.

Table sync 344 synchronizes customer data between server 302 and server 304. Further, table sync 344 synchronizes contents between CCSG system tables 316 and CCSG backup system tables 350; OPEN system tables 334 and OPEN backup system tables 352; data module 318 and data module 336. In an embodiment of the invention, synchronization of customer data may be performed periodically.

CMT sync 346 performs various synchronization processes between servers 302 and 304. The various synchronization processes synchronize UNICA catalogs, UNICA macros, and UNICA templates between server 302 and 304. In an embodiment of the invention, the synchronization processes may be performed periodically.

File sync 348 performs session file synchronization and UDI synchronization. Session file synchronization facilitates the synchronization of UNICA session files between OPEN and CCSG environments for failover measures. UDI synchronization enables the CCSG and the OPEN environments to see all the UDI files brought over. In an embodiment of the invention, synchronization is performed periodically.

On the failure of server 302, backup CCSG listener 308, present on server 304, is automatically instantiated. Processing of the campaigns is transferred from primary CCSG listener 306 to backup CCSG listener 308. Backup CCSG listener 308 traffics campaign-production management requests in the CCSG environment through CCSG backup configuration 354. CCSG backup configuration 354 is a configuration file that includes the various details of backup CCSG listener 308 that point to a backup application thread.

CCSG backup configuration 354 connects to CCSG backup system tables 350 and data module 336 to extract the required information for processing the campaigns. CCSG backup configuration 354 drives memory management and database management for the campaigns being processed. CCSG backup system tables 350 include UNICA Affinium system tables that are used for processing the campaigns.

Processing of the transferred CCSG campaigns is then performed by utilizing extracts 338, sessions 340, XML parser 342, and post-campaign batch process 326, as described above.

On the restoration of server 302, a failback of the transferred campaigns is performed from backup CCSG listener 308 to primary CCSG listener 306.

In another embodiment of the invention, OPEN listener 312 is automatically instantiated on the failure of server 304. Processing of the campaigns is transferred from primary OPEN listener 310 to backup OPEN listener 312. Backup OPEN listener 312 traffics campaign-production management requests in the OPEN environment through OPEN backup configuration 356. OPEN backup configuration 356 is a configuration file that includes various details of backup OPEN listener 312, which point to a backup application thread.

OPEN backup configuration 356 connects to OPEN backup system tables 352 and data module 318 to extract the required information for processing the campaigns. OPEN backup configuration 356 drives memory management and database management for the campaigns being processed. OPEN backup system tables 352 include UNICA Affinium system tables that are used for processing the campaigns.

Processing of the transferred OPEN campaigns is then performed by utilizing extracts 320, sessions 322, XML parser 324, and post-campaign batch process 326, as described above.

On the restoration of server 304, a failback of the transferred campaigns is performed from backup OPEN listener 312 to primary OPEN listener 310.

Figure 4:
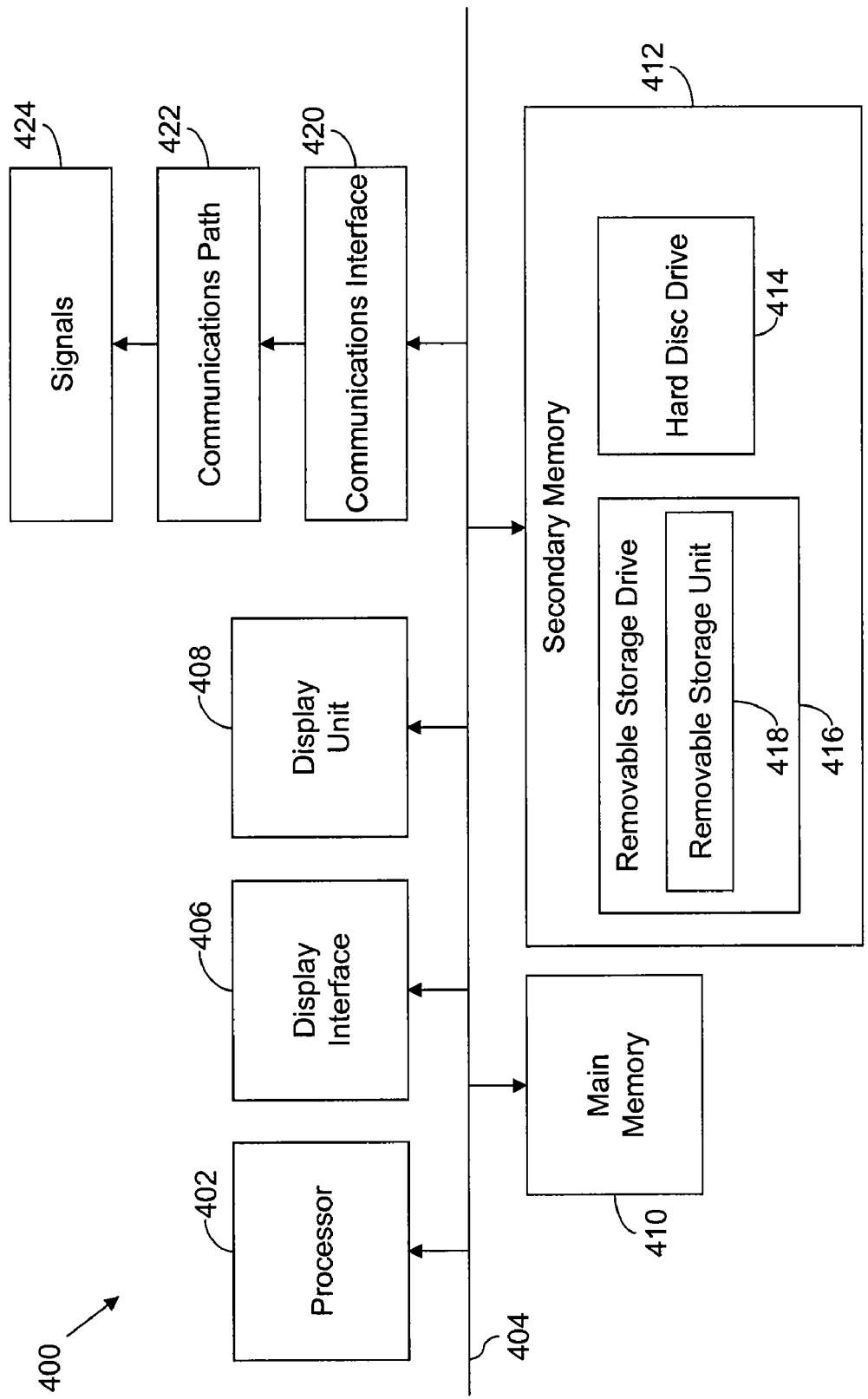
FIG. 4 is a block diagram of an exemplary computer system that is useful for implementing the invention.

The present invention, i.e., system 100, process 200, system 300 or any part(s) or function(s) thereof, may be implemented by using hardware, software or a combination thereof, and may be implemented in one or more computer systems or other processing systems. However, the manipulations performed by the present invention is often referred to in terms such as adding or comparing, which are commonly associated with the mental operations performed by a human operator. This capability of a human operator is unnecessary, or undesirable, in most cases, in any of the operations described herein, which form part of the present invention. On the contrary, the operations are machine operations. Useful machines for performing the operations of the present invention include general-purpose digital computers or similar devices. An example of a computer system 400 is shown in FIG. 4.

Computer system 400 includes one or more processors such as processor 402. Processor 402 is connected to a communication infrastructure 404, e.g., a communication bus, a cross-over bar or network. Various software embodiments are described in terms of this exemplary computer system. After reading this description, it will become apparent to a person skilled in the relevant art(s) how the invention can be implemented by using other computer systems and/or architectures.

Computer system 400 can include a display interface 406 that forwards graphics, text, and other data from communication infrastructure 404 (or from a frame buffer that is not shown) for display on a display unit 408.

Computer system 400 also includes a main memory 410, preferably a random access memory (RAM), and may also include a secondary memory 412. Secondary memory 412 may include, for example, a hard disk drive 414 and/or a removable storage drive 416 representing a floppy disk drive, a magnetic tape drive, an optical disk drive, etc. Removable storage drive 416 reads from and/or writes to a removable storage unit 418 in a well-known manner. Removable storage unit 418 represents a floppy disk, a magnetic tape, an optical disk, etc., which is read by and written to by removable storage drive 416. As will be appreciated, removable storage unit 418 includes a computer-usable storage medium with stored computer software and/or data.

In alternative embodiments, secondary memory 412 may include other similar devices, enabling computer programs or other instructions to be loaded into computer system 400. Such devices may include, for example, a removable storage unit and an interface. Examples of these devices may include a program cartridge and a cartridge interface such as those found in video game devices, a removable memory chip such as an erasable programmable read-only memory (EPROM), or a programmable read only memory (PROM)) and an associated socket, as well as other removable storage units and interfaces, which enable software and data to be transferred from the removable storage unit to computer system 400.

Computer system 400 may also include a communications interface 420, which enables software and data to be transferred between computer system 400 and external devices. Examples of communications interface 420 may include a modem, a network interface such as an Ethernet card, a communications port, a Personal Computer Memory Card International Association (PCMCIA) slot and card, etc. Software and data transferred via communications interface 420 are in the form of signals 424, which may be electronic, electromagnetic, optical or other signals that are capable of being received by communications interface 420. These signals 424 are provided to communications interface 420 via a communications path 422 (e.g. channel). This communications path 422 carries signals 424 and may be implemented by using a wire or cable, fiber optics, a telephone line, a cellular link, a radio frequency (RF) link, and other communications channels.

In this document, the terms 'computer program medium' and 'computer-usable medium' are used to generally refer to media such as removable storage drive 416, a hard disk installed in hard disk drive 414, and signals 424. These computer program products provide software to computer system 400. The invention is directed at such computer program products.

Computer programs (also referred to as computer control logic) are stored in main memory 410 and/or secondary memory 412. These computer programs may also be received via communications interface 420. Such computer programs, when executed, enable computer system 400 to perform the features of the present invention, as discussed herein. In particular, the computer programs, when executed, enable processor 402 to perform the features of the present invention. Accordingly, such computer programs act as the controllers of computer system 400.

In an embodiment where the invention is implemented by using software, the software may be stored in a computer program product and loaded into computer system 400 by using removable storage drive 416, hard disk drive 414 or communications interface 420. The control logic (software), when executed by processor 402, causes processor 402 to perform the functions of the invention, as described herein.

In another embodiment, the invention is implemented primarily in hardware, using, for example, hardware components such as application-specific integrated circuits (ASICs). Implementation of the hardware state machine, to perform the functions described herein, will be apparent to persons skilled in the relevant art(s).

In yet another embodiment, the invention is implemented by using a combination of both hardware and software.

V. Conclusion

While various embodiments of the present invention have been described above, it should be understood that they have been presented by way of example and not limitation. It will be apparent to persons skilled in the relevant art(s) that various changes in form and detail can be made therein, without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for exemplary purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly by a cursory inspection the nature and essence of the technical disclosure of the application. The Abstract is not intended to be limiting to the scope of the present invention in any way.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method comprising:
    processing, by a computer-based system for campaign management, a first plurality of campaigns on a primary server;
    processing, by the computer-based system, a second plurality of campaigns on a secondary server;
    synchronizing, by the computer-based system, contents for the first plurality of campaigns between the primary server and the secondary server;
    synchronizing, by the computer-based system, contents for the second plurality of campaigns between the secondary server and the primary server;
    processing, by the computer-based system using a primary server listener running on the secondary server, a first campaign-processing request upon failure of the primary server, wherein the first campaign-processing request is not rerouted to the secondary server; and
    processing, by the computer-based system using a secondary server listener running on the primary server, a second campaign-processing request upon failure of the secondary server, wherein the second campaign-processing request is not rerouted to the primary server.

2. The method of claim 1, further comprising periodically updating, by the computer-based system, customer data on at least one of: the primary server and the secondary server.

3. The method of claim 1, further comprising executing, by the computer-based system, at least one of the first plurality of campaigns and the second plurality of campaigns at a predetermined time.

4. The method of claim 1, further comprising processing, by the computer-based system, the first plurality of campaigns and the second plurality of campaigns utilizing an enterprise marketing management solution.

5. The method of claim 1, further comprising periodically synchronizing, by the computer-based system, contents for the first plurality of campaigns and the second plurality of campaigns.

6. The method of claim 1, wherein synchronizing contents for the first plurality of campaigns and the second plurality of campaigns comprises synchronizing at least one of: user data tables, customer data, catalogs, macros, templates, extracts, sessions and user-defined instructions.

7. An article of manufacture including a non-transitory, tangible computer readable medium having instructions stored thereon that, in response to execution by a computer-based system for campaign management, cause the computer-based system to perform operations comprising:
    processing, by the computer-based system, a first plurality of campaigns on a primary server;
    processing, by the computer-based system, a second plurality of campaigns on a secondary server;
    synchronizing, by the computer-based system, contents for the first plurality of campaigns between the primary server and the secondary server;
    synchronizing, by the computer-based system, contents for the second plurality of campaigns between the secondary server and the primary server;
    processing, by the computer-based system using a primary server listener running on the secondary server, a first campaign-processing request upon failure of the primary server, wherein the first campaign-processing request is not rerouted to the secondary server; and
    processing, by the computer-based system using a secondary server listener running on the primary server, a second campaign-processing request upon failure of the secondary server, wherein the second campaign-processing request is not rerouted to the primary server.

8. The article of claim 7, further comprising periodically updating, by the computer-based system, customer data on at least one of: the primary server and the secondary server.

9. The article of claim 7, further comprising executing, by the computer-based system, at least one of the first plurality of campaigns and the second plurality of campaigns at a predetermined time.

10. The article of claim 7, further comprising processing, by the computer-based system, the first plurality of campaigns and the second plurality of campaigns utilizing an enterprise marketing management solution.

11. The article of claim 7, further comprising periodically synchronizing, by the computer-based system, contents for the first plurality of campaigns and the second plurality of campaigns.

12. The article of claim 7, wherein synchronizing contents for the first plurality of campaigns and the second plurality of campaigns comprises synchronizing at least one of: user data tables, customer data, catalogs, macros, templates, extracts, sessions and user-defined instructions.

13. A system comprising:
a tangible, non-transitory memory communicating with a processor for campaign management,
the tangible, non-transitory memory having instructions stored thereon that, in response to execution by the processor, cause the processor to perform operations comprising:
processing, by the processor, a first plurality of campaigns on a primary server;
processing, by the processor a second plurality of campaigns on a secondary server;
synchronizing, by the processor, contents for the first plurality of campaigns between the primary server and the secondary server;
synchronizing, by the processor, contents for the second plurality of campaigns between the secondary server and the primary server;
processing, by the processor using a primary server listener running on the secondary server, a first campaign-processing request upon failure of the primary server, wherein the first campaign-processing request is not rerouted to the secondary server; and
processing, by the processor using a secondary server listener running on the primary server, a second campaign-processing request upon failure of the secondary server, wherein the second campaign-processing request is not rerouted to the primary server.

14. The system of claim 13, wherein the processor further performs operations comprising periodically updating, by the processor, customer data on at least one of: the primary server and the secondary server.

15. The system of claim 13, wherein the processor further performs operations comprising executing, by the processor, at least one of the first plurality of campaigns and the second plurality of campaigns at a predetermined time.

16. The system of claim 13, wherein the processor further performs operations comprising processing, by the processor, the first plurality of campaigns and the second plurality of campaigns utilizing an enterprise marketing management solution.

17. The system of claim 13, wherein the processor further performs operations comprising periodically synchronizing, by the processor, contents for the first plurality of campaigns and the second plurality of campaigns.

18. The system of claim 13, wherein synchronizing contents for the first plurality of campaigns and the second plurality of campaigns comprises synchronizing at least one of: user data tables, customer data, catalogs, macros, templates, extracts, sessions and user-defined instructions.

* * * * *